United States Patent
Jankovic et al.

(10) Patent No.: US 7,823,563 B2
(45) Date of Patent: Nov. 2, 2010

(54) CYLINDER-BY-CYLINDER BALANCING OF COMBUSTION TIMING IN HCCI ENGINES

(75) Inventors: Mrdjan J. Jankovic, Birmingham, MI (US); Yanying Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 12/117,660

(22) Filed: May 8, 2008

(65) Prior Publication Data

US 2009/0281713 A1 Nov. 12, 2009

(51) Int. Cl.
*F02M 7/00* (2006.01)
(52) U.S. Cl. .................................. 123/436; 701/103
(58) Field of Classification Search ................ 123/436, 123/90.15; 701/103, 111
See application file for complete search history.

(56) References Cited

U.S. PATENT DOCUMENTS

| | | | |
|---|---|---|---|
| 5,016,591 A * | 5/1991 | Nanyoshi et al. | 123/406.2 |
| 5,385,129 A * | 1/1995 | Eyberg | 123/436 |
| 6,640,754 B1 | 11/2003 | Iida | |
| 6,966,295 B2 | 11/2005 | Yamaoka et al. | |
| 7,027,910 B1 * | 4/2006 | Javaherian et al. | 701/111 |
| 7,073,485 B2 * | 7/2006 | Truscott et al. | 123/406.22 |
| 7,128,048 B2 | 10/2006 | Yamaoka et al. | |
| 7,380,540 B1 * | 6/2008 | Duffy et al. | 123/435 |
| 7,426,916 B2 * | 9/2008 | Reed et al. | 123/299 |
| 7,469,181 B2 * | 12/2008 | Duffy et al. | 701/108 |
| 7,500,470 B2 * | 3/2009 | Buslepp et al. | 123/436 |
| 2005/0183693 A1 * | 8/2005 | Yang et al. | 123/305 |
| 2007/0113821 A1 * | 5/2007 | Kang et al. | 123/299 |
| 2007/0215096 A1 | 9/2007 | Kumano et al. | |

* cited by examiner

*Primary Examiner*—Stephen K Cronin
*Assistant Examiner*—David Hamaoui
(74) *Attorney, Agent, or Firm*—Allan J. Lippa; Alleman Hall McCoy Russell & Tuttle LLP (57) ABSTRACT

Various systems and methods are described for controlling fuel injection to a plurality of cylinders. One example method comprises during combustion timing imbalances among a plurality of cylinders carrying out homogeneous charge compression ignition combustion, adjusting a fuel injection amount in a first cylinder to adjust a combustion timing of the first cylinder in a first direction, and correspondingly adjusting a fuel injection amount in a second cylinder in a second direction to maintain average engine torque and reduce the imbalance.

13 Claims, 6 Drawing Sheets

CYLINDER-BY-CYLINDER BALANCING OF COMBUSTION TIMING IN HCCI ENGINES

FIELD

The present application relates to balancing combustion timing of cylinders in an HCCI engine.

BACKGROUND AND SUMMARY

Internal combustion engines may operate in a variety of combustion modes. One example mode is homogeneous charge compression ignition (HCCI), wherein an air and fuel mixture achieves a temperature where combustion occurs by auto-ignition without requiring a spark by a sparking device.

Effective and stable HCCI combustion timing can be achieved by controlling in-cylinder temperature and pressure within prescribed limits. However, HCCI combustion may be sensitive to air and cylinder temperature variations. Further, resulting cylinder-to-cylinder temperature imbalances and variability can lead to inefficient combustion, or even misfires. One approach for more accurately controlling combustion timing is described in U.S. Pat. No. 7,128,048 B2 wherein a cylinder-specific combustion state is estimated and adjusted on a cylinder basis.

In U.S. Pat. No. 7,128,048 B2, by controlling a variable valve mechanism, a fuel injection mechanism, and a transmission, either independently or coordinately, based on input received from a combustion state estimating means, the method controls combustion timing. Specifically, the combustion state estimating means estimates the combustion state of each cylinder by detecting the cylinder pressure peak value and peak timing and assessing the deviation of these values from a predetermined range of values. When regulation of an individual cylinder's peak pressure value or timing in relation to a predetermined value or timing is brought about via the fuel injection mechanism, the combustion control means adjusts the amount of fuel injected to that cylinder during the minus overlap period.

However, the inventors herein have recognized disadvantages with such an approach. For example, the fuel injected during negative overlap, also known as the pilot injection, is burned with very low efficiency in terms of torque production due to a limited compression and expansion of the gas. This results in a fuel economy penalty which reduces the benefits of the HCCI engine combustion. Another disadvantage is that while the amount of fuel injected into a cylinder is adjusted to affect that cylinder's combustion timing, the torque produced by that cylinder may also be affected. As such, while combustion timing of that cylinder may be brought closer to that of the remaining cylinders, the combustion torque of that cylinder may diverge away from that of the remaining cylinders.

The inventors herein have recognized that a cylinder-by-cylinder balancing can be achieved with a main injection, while maintaining the average engine torque during the cycle at a desired amount. This method may be applied regardless of whether a negative-overlap HCCI control mechanism or, as specified later in this disclosure, a heated intake-air HCCI control mechanism is used. Thus, in one example, the above issues may be addressed by a method of operating an engine in a vehicle carrying out homogeneous charge compression ignition by controlling fuel injection to a plurality of cylinders, the method comprising: adjusting a fuel injection amount in a first cylinder to adjust a combustion timing of the first cylinder in a first direction, and correspondingly adjusting a fuel injection amount in the remaining cylinders in a second direction, such that average engine torque is maintained and timing imbalance is reduced. For example, when the first cylinder and second cylinder have a difference in combustion timing (e.g., either the first cylinder is too advanced, or the second cylinder is too retarded), the fuel injected to both of the first and second cylinders is adjusted, albeit in different directions.

In this way, by adjusting the fuel in each cylinder in different directions, both cylinders can be brought closer to a common combustion timing, while also maintaining the average torque produced by the two cylinders. Thus, cylinder-by-cylinder combustion timing and average torque control may be achieved.

DETAILED DESCRIPTION

Figure 1:
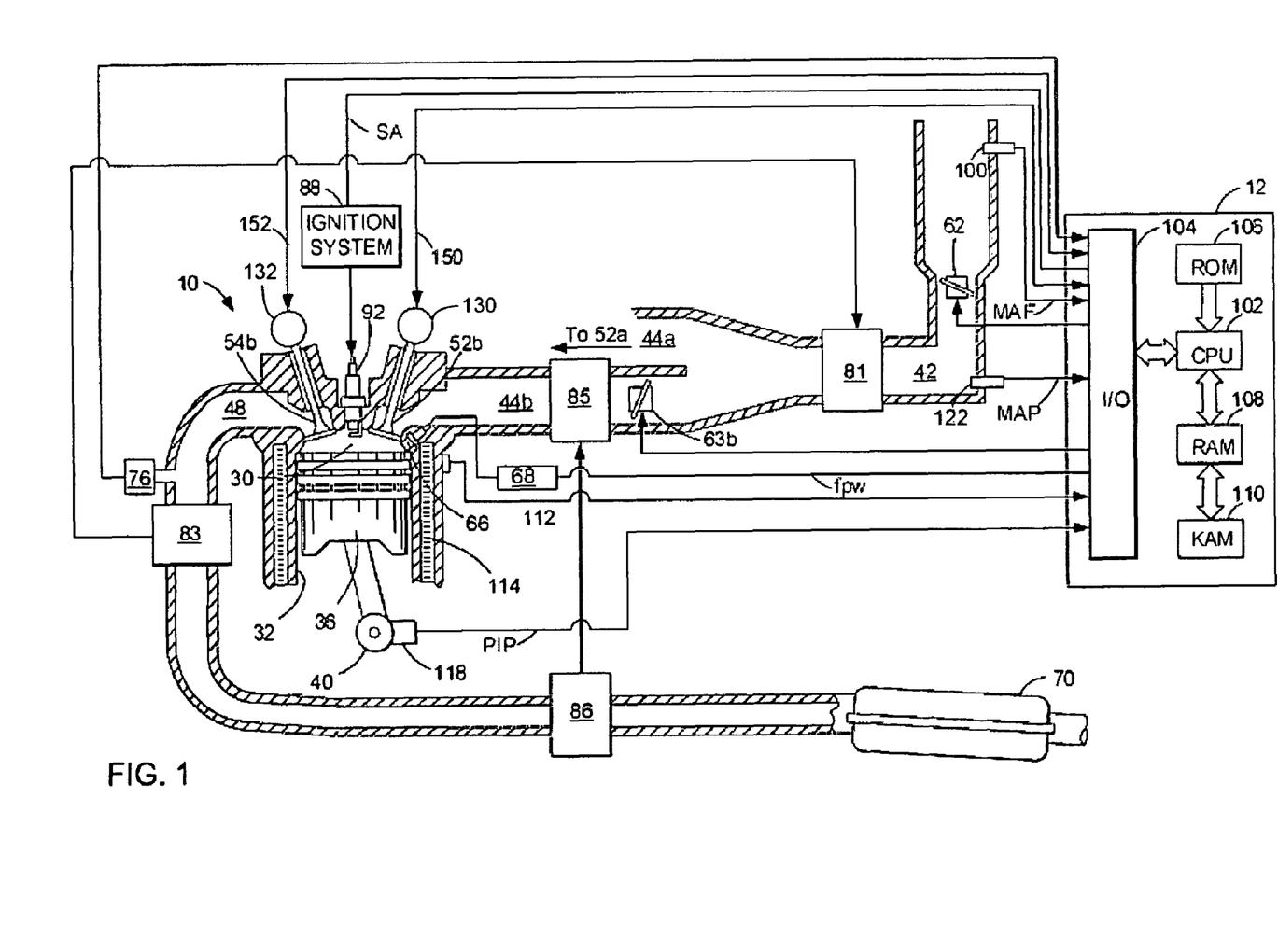
FIG. 1 shows an example engine cylinder configuration.

FIG. 1 is a schematic diagram of one cylinder of a multi-cylinder engine 10, as well as one of the intake and exhaust paths connected to that cylinder. As described in further detail below, the engine may carry out homogeneous charge compression ignition combustion with improved combustion timing control. The average combustion timing of a plurality of the engine cylinders may be controlled by controlling the intake air-charge temperature, such as via control of a plurality of different temperature airflows delivered to the engine, or via control of intake/exhaust valve operation (e.g., timing/lift). Further, the individual cylinder combustion timings may be respectively controlled by individual cylinder fuel injection adjustments. Additionally, the fuel injection adjustments made on a cylinder-by-cylinder basis may be selected to balance cylinder torque among the cylinders, while still controlling combustion timing. For example, if a first cylinder has combustion timing advanced relative to a second cylinder, the fuel injection amount to the first cylinder can be increased, while the fuel injection amount to the second cylinder can be decreased, so that the combustion timings of both cylinders are moved toward one another, while a cycle-averaged torque among the two cylinders remains substantially un-changed, thereby suppressing torque disturbances.

Figure 2:
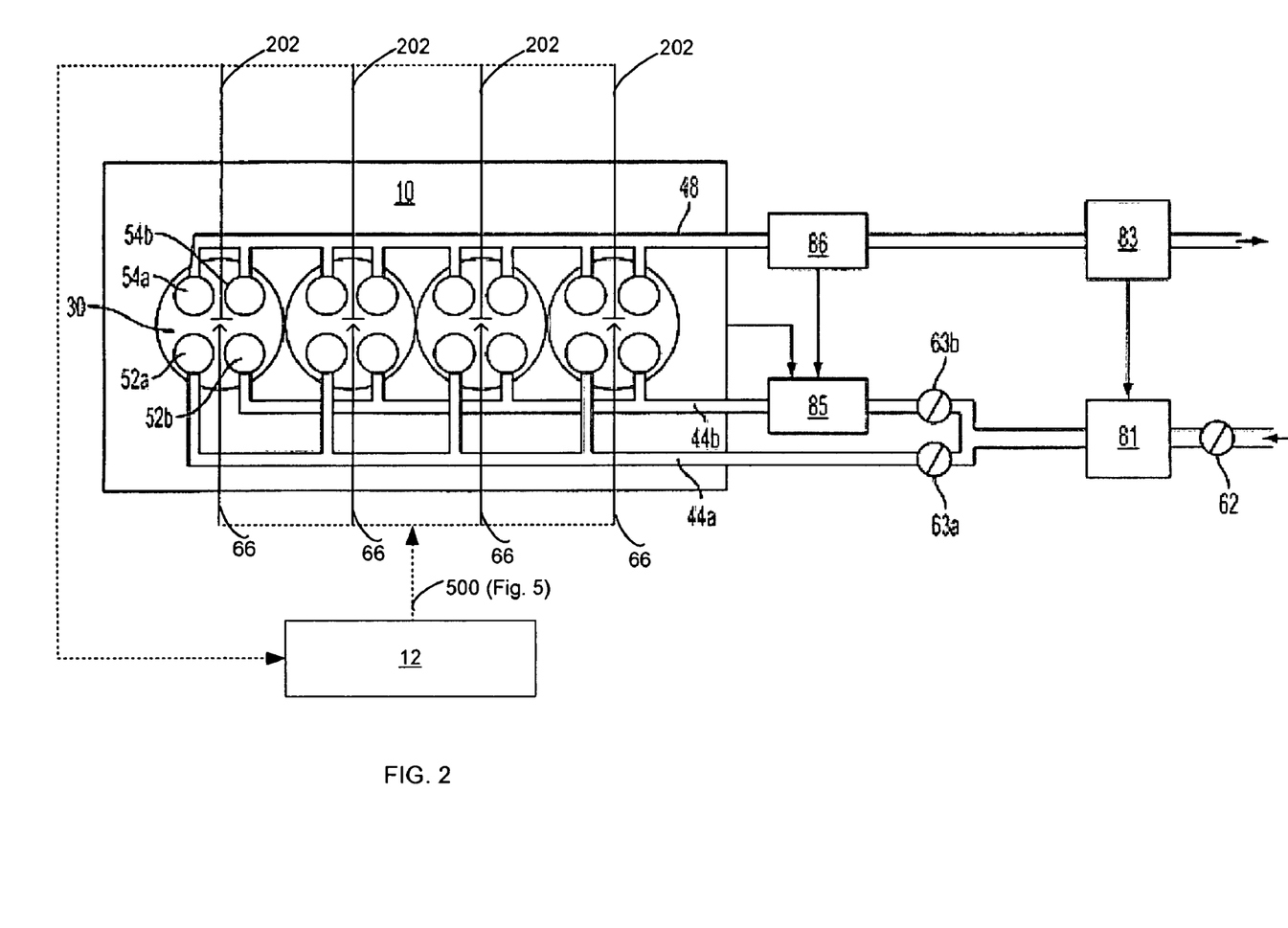
FIG. 2 shows an alternate view of the example engine of FIG. 1.

Referring now specifically to FIG. 1, it shows a direct injection internal combustion engine 10, comprising a plurality of combustion chambers, controlled by a control system including electronic engine controller 12. Combustion chamber 30, herein also alternatively referred to as cylinder 30, of engine 10 is shown including combustion chamber walls 32 with piston 36 positioned therein and connected to crankshaft 40. A starter motor (not shown) may be coupled to crankshaft 40 via a flywheel (not shown). Combustion chamber 30 is shown communicating with intake manifold 44*b* and exhaust manifold 48 via respective intake valve 52*b* and exhaust valve 54b. Combustion chamber 30 also may communicate with intake manifold 44a and exhaust manifold 48 via respective intake valve 52a and exhaust valve 54a (as shown in FIG. 2). As will be described below in greater detail, intake air may be delivered to combustion chamber 30 via valve 52b at a higher temperature than intake air supplied via valve 52a.

Fuel injector 66 is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel may be delivered to fuel injector 66 by a conventional high pressure fuel system (not shown) including a fuel tank, fuel pumps, and a fuel rail.

Intake manifold 42 is shown communicating with main throttle 62. In this particular example, the position of throttle 62 may be varied by controller 12 via an electric motor. This configuration is commonly referred to as electronic throttle control (ETC), which may also be utilized during idle speed control.

Engine 10 may further include a compression device such as a turbocharger, including a compressor 81 arranged along intake manifold 42 and a turbine 83 arranged along exhaust manifold 48. Turbine 83 may supply mechanical work to compressor 81 via a shaft, for example. Intake manifold 42 is shown branching into intake manifold 44b and intake manifold 44a. Intake manifold 44b may include an electronic throttle 63b as described above with reference to throttle 62. Similarly, intake manifold 44a may include an electronic throttle 63a (as shown in FIG. 2). Intake manifold 44b is further shown including an intake heat exchanger 85 configured to provide thermal energy (i.e. heat) to the air flowing through intake manifold 44b. Thermal energy may be provided to heat exchanger 85 by a variety of sources such as an optional exhaust heat exchanger 86 (as shown) arranged in exhaust manifold 48, hot engine coolant, or via conversion of electrical energy to heat via an electric resistance heater. It should be appreciated that in some embodiments, throttle 63b may be located downstream of heat exchanger 85, or engine 10 may not include one or more of throttles 62, 63a, and/or 63b.

Exhaust gas sensor 76 is shown coupled to exhaust manifold 48 upstream of emission control device 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 may be a three way catalyst, NOx trap, various other devices, or combinations thereof. In some embodiments, engine 10 may include a vapor recovery system enabling recovery of fuel vapors from a fuel tank and/or fuel vapor storage canister via purge control valve to at least one of intake manifolds 44a and 44b.

Controller 12 is shown as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100; engine coolant temperature (ECT) from temperature sensor 112 coupled to cooling sleeve 114; a profile ignition pickup signal (PIP) from Hall effect (or other type) sensor 118 coupled to crankshaft 40; throttle position from a throttle position sensor; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft. Controller 12 may be further configured to control the amount of heat supplied to the intake air passing through heat exchanger 85, the position of electronic throttles 44a and 44b, and the amount of boost provided by compressor 81.

Continuing with FIG. 1, engine 10 is shown with an intake camshaft 130 and an exhaust camshaft 132, where camshaft 130 actuates both intake valves 52a (shown in FIG. 2) and 52b and camshaft 132 actuates both exhaust valves 54a (shown in FIG. 2) and 52b. The valves can be actuated via lift cam profiles on the camshafts where the lift profiles between the different valves may provide varying lift height, lift duration, and/or timing. However, alternative camshaft (overhead and/or pushrod) arrangements could be used, if desired.

Further, lift height, lift duration and/or timing of valves 52a,b and 54a,b can be varied respectively by various valve control devices responsive to signals from controller 12, based on operating conditions. In some embodiments, valve control devices may include a cam profile switching (CPS) device and/or variable cam timing (VCT) device to provide adjustment of valve operation. These valve/cam control devices may be hydraulically powered, or electrically actuated, or combinations thereof. Signal line 150 can send a control signal to and receive a cam timing and/or cam selection measurement from cam shaft 130. Likewise, signal line 152 can send a control signal to and receive a cam timing and/or cam selection measurement from cam shaft 132.

As described above, FIG. 1 merely shows one cylinder of a multi-cylinder engine, and that each cylinder has its own set of intake/exhaust valves, fuel injectors, spark plugs, etc. However, some or all of the cylinders may share some components such as cam shafts 130 and 132 for controlling valve operation. In this manner, a single cam shaft may be used to control valve operation for two or more cylinders. In an alternative embodiment, a port fuel injection configuration may be used where a fuel injector is coupled to at least one of the intake manifolds for providing port injection, rather than directly to cylinder 30.

Further, in the disclosed embodiments, an exhaust gas recirculation (EGR) system may route a desired portion of exhaust gas from exhaust manifold 48 to at least one of intake manifold 42, 44a, and/or 44b via an EGR valve (not shown). Alternatively, a portion of combustion gases may be retained in the combustion chambers by controlling exhaust valve timing.

Combustion sensing may be used in connection with the depicted embodiment, as illustrated in FIG. 2 and described herein. A combustion sensor 202 (as shown in FIG. 2) may be coupled to an individual cylinder on a per cylinder basis or to a cylinder head that comprises a plurality of cylinders. Alternatively, combustion sensor 202 may be installed inside the cylinder. The combustion sensor may be an appropriate sensor as known in the art for example a knock sensor, a vibration sensor, a temperature sensor, a pressure sensor, etc, or any combination thereof. Combustion sensor 202 may sense combustion relevant parameters such as a peak pressure value, the location of a peak pressure (LPP), the timing of a peak pressure, the location of 50% burned mass fraction, also identified as the crank angle at which 50% of the fuel mass has been burned (CA_50), or any combination thereof, for example. Information from one or more combustion sensors may be used to determine an appropriate mode of combustion and an appropriate cylinder timing imbalance adjustment as described in FIGS. 3 and 4 and described herein below.

The engine 10 may be controlled to vary operation between a spark ignition (SI) mode and a homogeneous charge compression ignition (HCCI) mode. In SI mode of combustion, ignition system 88 provides an ignition spark to combustion chamber 30 via spark plug 92 in response to spark advance signal SA from controller 12. While SI combustion may be utilized across a broad range of engine torque and speed it may produce increased levels of NOx and lower fuel efficiency when compared with other types of combustion. Alternately, engine 10 may opt to perform an HCCI mode of combustion, particularly during low speed and/or light load ranges. During HCCI mode, or a controlled auto-ignition (CAI) mode, auto-ignition of combustion chamber gases occur at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio. Various operating conditions of the engine may be altered to provide different combustion modes, such as fuel injection timing and quantity, EGR, valve timing, valve lift, valve operation, valve deactivation, intake air heating and/or cooling, turbocharging, throttling, etc.

Referring now to FIG. 2, a schematic diagram of engine 10 is shown. In particular, engine 10 is shown having four cylinders; however, it should be appreciated that the engine may include any number of cylinders. As described above with reference to FIG. 1, combustion chamber 30 is shown having two intake valves 52a and 52b, and two exhaust valves 54a and 54b. Intake manifold 44a is shown communicating with combustion chamber 30 via intake valve 52a and intake manifold 44b is shown communicating with combustion chamber 30 via intake valve 52b. Intake manifolds 44a and 44b are further shown combining upstream of the throttle to form intake manifold 42.

Engine 10 may include one or more throttles. For example, throttle 62 as described above may be used to control the flow of air through intake manifold 42 via controller 12. Similarly, intake manifold 44a may be configured with throttle 63a and intake manifold 44b may be configured with throttle 63b for controlling the flow of intake air to the cylinders. In such an embodiment, as depicted in FIG. 2 and as referred to herein, throttle 63a may be referred to as "cold throttle" while throttle 63b may be referred to as "hot throttle". However, in some embodiments, engine 10 may not include one or more of throttles 62, 63a, and 63b. In yet another alternate embodiment, engine 10 may include an independent throttle for each intake valve of one or more cylinders.

Intake manifold 44b may include a heat exchanger 85 that provides heat to air flowing through intake manifold 44b. Heat may be supplied to heat exchanger 85 by one or more sources. For example, heat may be supplied to heat exchanger 85 via heat recovered by heat exchanger 86 arranged in exhaust manifold 48 and/or engine coolant supplied from an engine coolant system. In this manner, combustion chamber 30 may be configured to receive intake air via two sources, each having substantially different temperatures. Engine 10 may further include a compression device (not shown) such as a turbocharger or a supercharger. The compression device may include a compressor 81 arranged in intake manifold 42 that is powered by turbine 83 arranged in exhaust manifold 48 via a shaft.

Each cylinder 30 of engine 10 may be configured to receive intake air via intake manifolds 44a and 44b. Intake air delivered to the combustion chamber via intake manifold 44b may be heated more than the air delivered via intake manifold 44a by varying the amount of heat supplied to intake manifold 44b via heat exchanger 85. In this manner, the intake air supplied via intake manifold 44a may be cooler than the intake air supplied via intake manifold 44b, at least during some conditions. For that reason, as described herein, intake manifold 44a may be referred to as the "cold" intake manifold and intake manifold 44b may be referred to as the "hot" intake manifold, although these labels are merely relative. Further, intake valve 52a controlling the amount of air delivered to the combustion chamber via intake manifold 44a may be referred to as the "cold" intake valve and intake valve 52b may be referred to as the "hot" intake valve.

As described in further detail below, FIG. 2 illustrates how the positions of "hot" and "cold" throttles, delivering airflows at different temperatures, may be adjusted based on combustion feedback, to provide one form of syndicated combustion control in HCCI mode. Herein, the average combustion timing of all the cylinders may be affected by adjustments to the intake air-charge temperature by regulating the throttle positions. Individual cylinder combustion timing adjustments, whether independently or additionally desired, may be addressed by an in-cylinder fuel injection adjustment, as further described in FIGS. 3-6, such that timing imbalances are rectified with maintenance of cycle-average fuel consumption, and cycle-average torque. In a given engine cycle, the torque obtained from a firing cylinder is affected by the air-charge, spark timing and fuel amount to that cylinder. Over the course of one complete engine cycle, each cylinder of the engine may be fired once. Thus, by adjusting the fuel amount to each cylinder, the torque output of each individual cylinder may be altered. However, if the per cylinder fuel injection amount is appropriately adjusted, the average amount of fuel consumed per cycle may be kept constant, consequently permitting the average torque per engine cycle to also be kept constant.

Several approaches may be used to vary the combined temperature of the air delivered to the combustion chamber (i.e. the initial charge temperature). In one approach, the initial charge temperature may be increased by increasing the relative amount of intake air supplied via intake manifold 44b compared to the amount of intake air supplied via intake manifold 44a, while maintaining substantially the same total amount of intake air. In another approach, the initial charge temperature may be increased by increasing the relative amount of intake air supplied via intake manifold 44b compared to the amount of intake air supplied via intake manifold 44a, while varying the total amount of intake air provided to the combustion chamber. A corresponding set of routines performed with the amount of intake air supplied via intake manifold 44b may allow the initial charge temperature to be decreased. Alternately, in some approaches, the initial charge temperature may be adjusted by varying the amount of heat supplied to the hot manifold via heat exchanger 85. For example, the initial charge temperature may be adjusted by suitably increasing or decreasing the amount of heating provided to the hot manifold via the heat exchanger, thereby circumventing any adjustments to the amount of air supplied via the hot and/or cold manifolds.

It should be appreciated that the amount of air delivered via the hot and cold manifolds may also be further varied by adjusting at least one variable valve operation (e.g. lift height, lift duration, valve timing) of intake valves 52a and/or 52b, position of throttles 62, 63a, and/or 63b, and/or the amount of turbocharging provided to the intake manifolds. For example, the amount of air provided to the combustion chamber by an intake manifold may be increased by increasing at least one of lift and/or lift duration for the respective valve. In another example, the amount of air provided to the combustion chamber, for example, by intake manifold 44a may be decreased by adjusting throttle 63a.

When engine 10 is operating in the HCCI mode of combustion, the controller may estimate or determine an average combustion timing of all of the cylinders, as well as an individual cylinder combustion timing of each cylinder, based on the combustion relevant parameters estimated by combustion sensor 202. Combustion timings may also be based on various operating parameters.

In one aspect, controller 12 may analyze combustion peak pressure data for deviations from a predetermined range of peak pressure and/or deviation from a predetermined range of peak timing values. The predetermined range of peak timing may be based on a predetermined period of time after top dead center. When efficient HCCI combustion is being carried out, the peak timing of the cylinder pressure coincides with the peak timing of heat generation at a predetermined time after top dead center. Accordingly, by detecting cylinder peak pressure value and peak timing, an accurate estimation of cylinder combustion timing may be achieved. It should however be appreciated that depending on operating conditions, an efficient combustion may alternately be achieved if the peak timing falls within a predetermined range. For example, under certain operating conditions, it may be calculated that efficient combustion may be achieved if the peak timing falls within 0 to 10° after top dead center.

Given that HCCI combustion may be sensitive to air and cylinder temperature variations, cylinder-to-cylinder temperature imbalances and variability may result in inefficient combustion or even misfires. Consequently, during operation in HCCI mode, it may be desirable to exercise close control over the timing of auto-ignition. In view of this, controller 12 may determine individual cylinder combustion timings, and determine if there is a sufficiently large cylinder-to-cylinder timing imbalance, as depicted and further described in FIGS. 3 and 4. In the event that a cylinder-to-cylinder timing imbalance is identified, controller 12 may then proceed to perform an in-cylinder combustion timing imbalance adjustment protocol 500, as depicted and further described in FIG. 5. By performing in-cylinder combustion timing imbalance adjustment protocol 500, controller 12 may suitably adjust the mass of fuel injected by fuel injector 66 to each cylinder thereby correcting for imbalances in combustion timing, while maintaining the average amount of fuel injected per engine cycle, and thus maintaining the cycle average engine torque.

Figure 3:
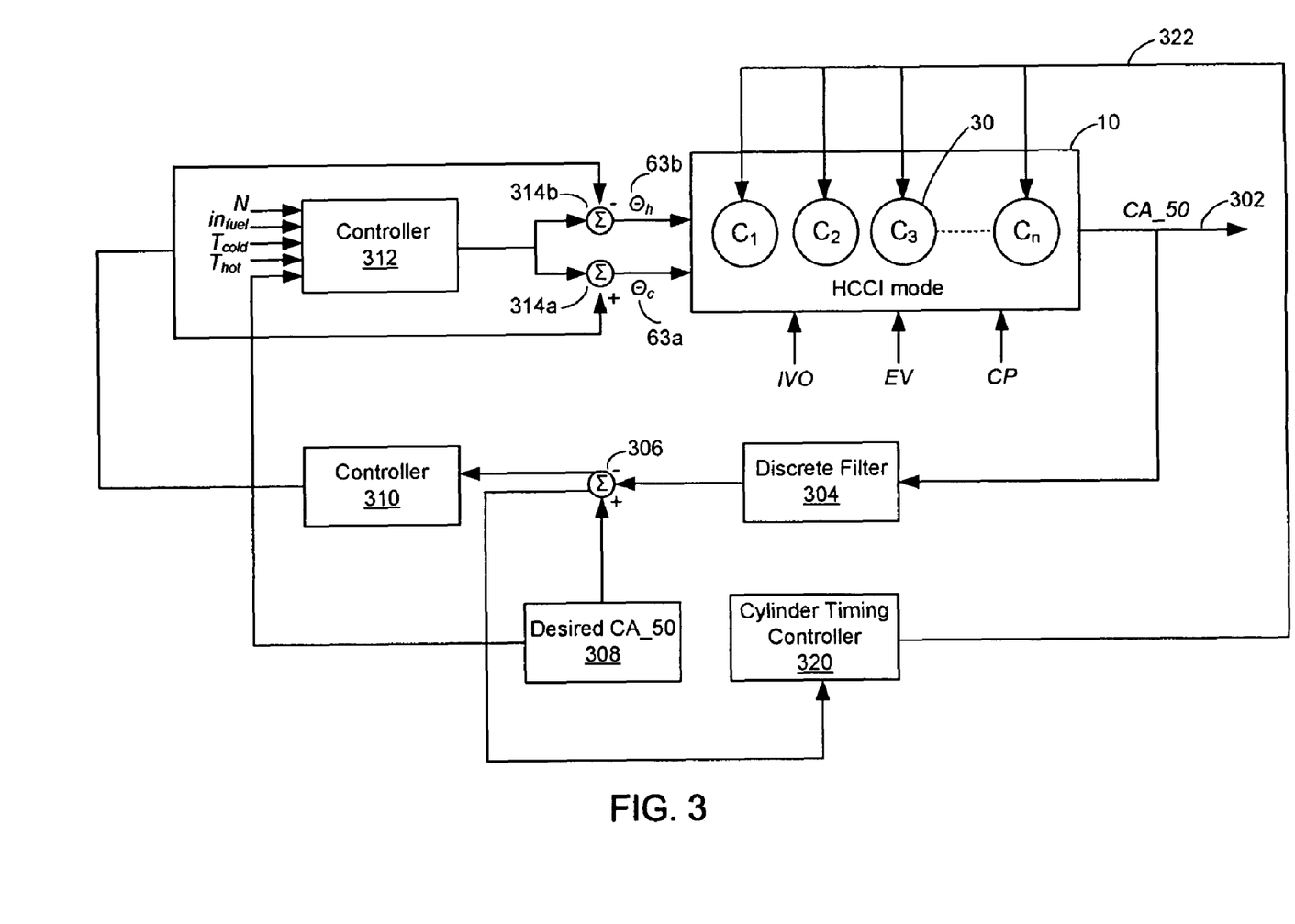
FIG. 3 shows a block diagram of a control system for regulating cylinder combustion

During HCCI, the heat release rate may not be substantially controlled by either the rate or duration of the fuel-injection process, as in a diesel engine, or by the turbulent flame propagation time, as in a spark-ignited engine. Therefore, during HCCI mode, the timing of auto-ignition may alternately be controlled by varying the charge temperature. As such, adjustments to cylinder combustion timing may be achieved by a consolidated change in the combustion timing of all cylinders of engine 10 using a closed loop controller, as shown in FIG. 3, making use of hot and cold throttles 63b and 63a respectively. This kind of an adjustment may be preferentially employed when the combustion timing in all cylinders of engine 10, are on an average retarded or advanced. In one example, if during HCCI combustion it is estimated by the combustion sensor 202 that the timing in all cylinders is on an average retarded and requires advancing, controller 12 may advance the combustion timing of all cylinders en bloc by increasing the temperature of the intake air-charge by opening the hot throttle and closing the cold throttle by a predefined amount, or an amount responsive to the value of a combustion feedback signal. In another example, if it is estimated by the combustion sensor 202 that the timing in all cylinders is on an average advanced and requires retarding, controller 12 may retard the combustion timing of all cylinders en bloc by decreasing the temperature of the intake air-charge by opening the cold throttle and closing the hot throttle by a predefined amount, or an amount responsive to the value of a combustion feedback signal. On the other hand, when desired air temperature is achieved but total air flow needs to be changed, the desired air flow can be obtained by varying the opening of both hot and cold throttles based on feedback from mass air flow sensors and/or combustion feedback.

Intake and exhaust valve profiles may also have an impact on cylinder air-charge temperature and composition. Consequently, variable valve operation may be used for a syndicated change in air-charge temperature, and thus combustion timing, of all cylinders. In one example, this may be achieved by switching the variable cam profile such that the valve operation of all the cylinders is affected. Furthermore, since the intake and exhaust valve profiles of each cylinder 30 of engine 10 may be controlled independently, variable valve operation may be used for adjusting combustion timing imbalances on a per-cylinder basis. Various valve operation adjustments may be used, such as advancing/retarding valve timing, increasing/decreasing valve lift, increasing/decreasing valve overlap, advancing/retarding intake valve opening, advancing/retarding intake valve closing, advancing/retarding exhaust valve opening, advancing/retarding exhaust valve closing, and combinations thereof, for example. In one example, if combustion sensor 202 estimates that the timing in all cylinders is on an average retarded and requires advancing, controller 12 may alter the cam profiles such that a consolidated retard in exhaust valve closing ensues, thereby increasing the temperature of the intake air-charge and consequently advancing the combustion timing of all cylinders. In another example, if only a first cylinder has combustion timing retarded relative to a second cylinder, the exhaust valve closing of the first cylinder can be retarded, and/or the exhaust valve closing of the second cylinder can be advanced. In this way, variable valve settings may be adjusted in a syndicated cylinder manner or a cylinder-specific manner in order to adjust combustion timing imbalances.

Intake and exhaust valve profiles of each cylinder of engine 10 may be controlled independently if the actuator has sufficient bandwidth, for example in the case of a continuously variable valve lift (CVVL) actuator controlled by a brushless rare electric earth motor. Other examples include variable valve timing (VVT) actuators, cam profile switching (CPS) devices and electromechanical valve actuation (EVA) devices. As explained above, by suitably adjusting the intake valve profile of a cylinder in accordance with an estimated cylinder-to-cylinder combustion timing imbalance, the combustion timing of that cylinder may be appropriately advanced or retarded. In one aspect, a control loop may make use of the information that at any given engine speed, torque and manifold pressure, the function between the start of combustion (SOC) and intake valve opening (as may be available from the engine mapping data) as:

$$SOC = f(IVO, T_{IVO})$$

where IVO is intake valve opening and $T_{IVO}$ is cylinder gas temperature at IVO.

In one example, if it is estimated that the combustion timing of cylinder 30 is advanced with respect to the other cylinders in engine 10, controller 12 may retard the timing of both hot and cold intake valves, 52*a,b*, while maintaining a fixed small or negative valve overlap, defined as such by a fixed number of crank degrees between intake valve closing and exhaust valve closing. The resultant change in volume of air in cylinder 30 may generate a smaller effective compression ratio. Consequently, a smaller cylinder gas temperature rise may ensue, thereby retarding the combustion timing of cylinder 30. In another example, if it is estimated that the combustion timing of cylinder 30 is delayed with respect to the other cylinders in engine 10, controller 12 may advance the timing of both hot and cold intake valves, 52*a,b*, while maintaining a fixed small or negative valve overlap. The resultant change in volume of air in cylinder 30 may generate a larger effective compression ratio and consequently a larger cylinder gas temperature rise may ensue, thereby advancing the combustion timing of cylinder 30.

In this way, controller 12 may adjust imbalances in cylinder combustion timing by adjusting the cylinder-to-cylinder amount of fuel injected, adjusting the variable valve operation, adjusting the cylinder air-charge temperature using a hot and cold throttle, or various combinations thereof. In doing so, the regulation of the start of auto-ignition combustion may be addressed.

Now referring to FIG. 3, a block diagram of a control system for regulating cylinder combustion by adjusting cylinder induction air-charge temperature, and/or by adjusting an in-cylinder amount of fuel injected, is shown.

Specifically, combustion timing signal 302 is provided to discrete filter 304. Signal 302 may include individual locations of 50% burned mass fraction for each of the cylinders 30, and may also indicate an average location for the cylinders. Discrete filter 304 may, for example, be a band-pass filter to reduce signal noise. The filtered data is then compared to a desired combustion state 308, depicted herein as "desired CA_50", at 306. The error, or deviation, in the combustion state phasing is fed to controller 310. In one example, controller 310 may include a proportional-integral-derivative controller (herein after referred to as "PID controller 310") integrated into central control system 12. Further, controller 310 may process the error signal to determine an engine-cycle-averaged location to be used for average combustion timing control of cylinders 30. Thus, in response to the error, controller 310 may appropriately adjust the setting 314*b* of hot throttle 63*b* and/or the setting 314*a* of cold throttle 63*a*, so as to vary the air-charge temperature and/or the air flow provided to engine 10. Alternately, controller 310 may perform a consolidated adjustment to the variable valve profile such that the air-charge temperature is altered. In this way, feedback control of the combustion state is provided, wherein the response of controller 310 can be adjusted by varying the gains of the PID controller to achieve a desired response to control errors in the average cylinder combustion timing caused by disturbances or changes in the combustion setpoint. As explained previously, by adjusting the settings of hot and cold throttles 63*b* and 63*a*, the valve-train settings, or any combination thereof, a consolidated change in the air-charge temperature, and consequently combustion timing, of all cylinders of engine 10 may be achieved, thereby providing control of the average auto-ignition timing of engine 10 during HCCI mode of operation, while maintaining overall airflow at a desired value.

Continuing with FIG. 3, feed-forward control adjustments to airflow may also be provided based on a multitude of engine operating conditions, for example engine speed (N), mass of fuel injected (in$_{fuel}$), temperature of cold air ($T_{cold}$) and temperature of the hot air ($T_{hot}$), as depicted. The engine operating conditions are fed to feed forward controller 312 which may compute suitable settings 314*a,b* for hot and cold throttles 63*a,b*. In this way, a combination of feedback control responsive to an error in combustion phasing and feed forward control, responsive to current engine operating conditions, can alter the combustion state of cylinders 30 together by suitably adjusting the hot and cold throttle settings, or the valve-train settings.

Figure 4:
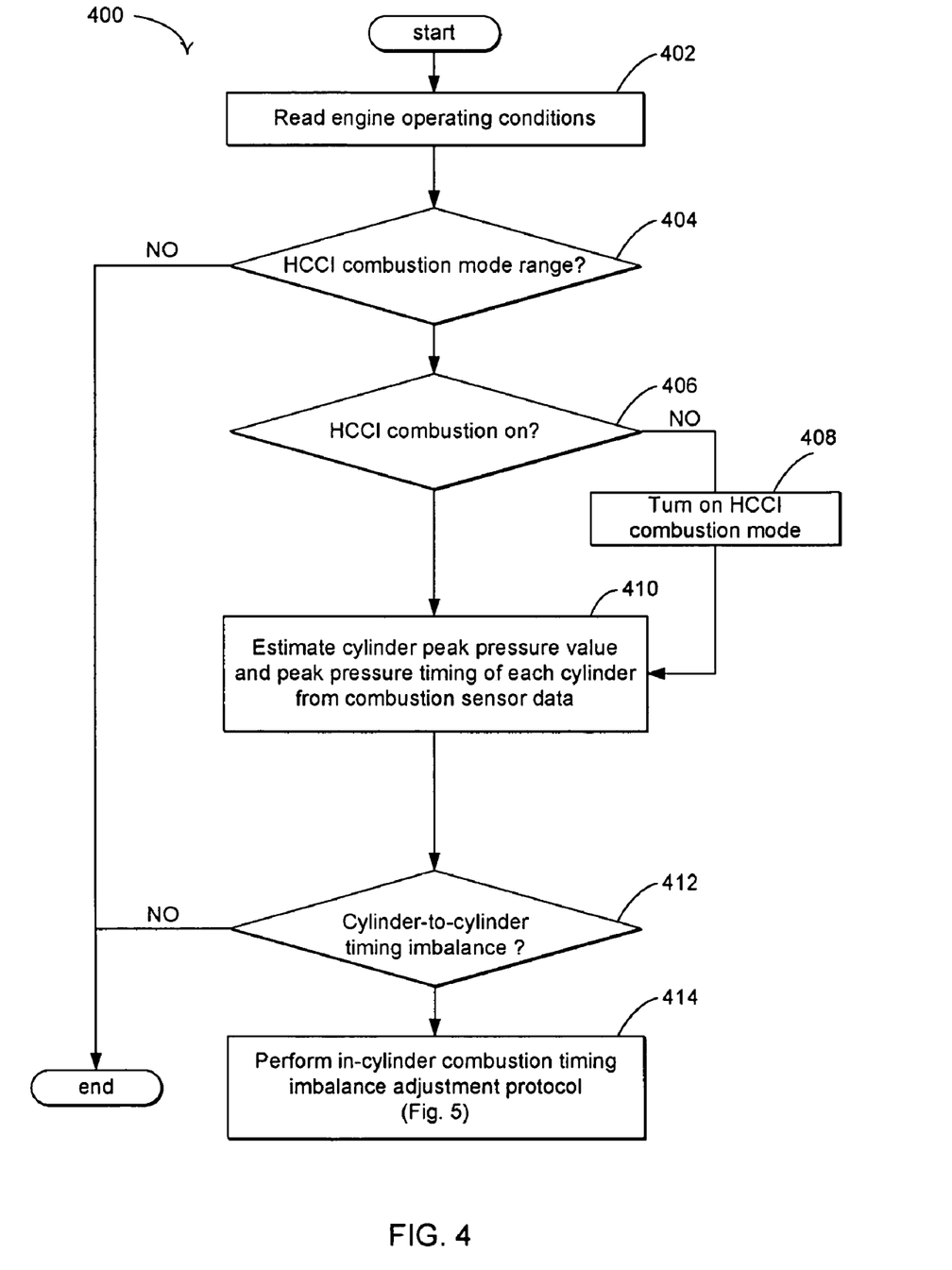
FIG. 4 shows an exemplary flow chart describing a control routine for identifying cylinder-to-cylinder combustion timing imbalances.
Figure 5:
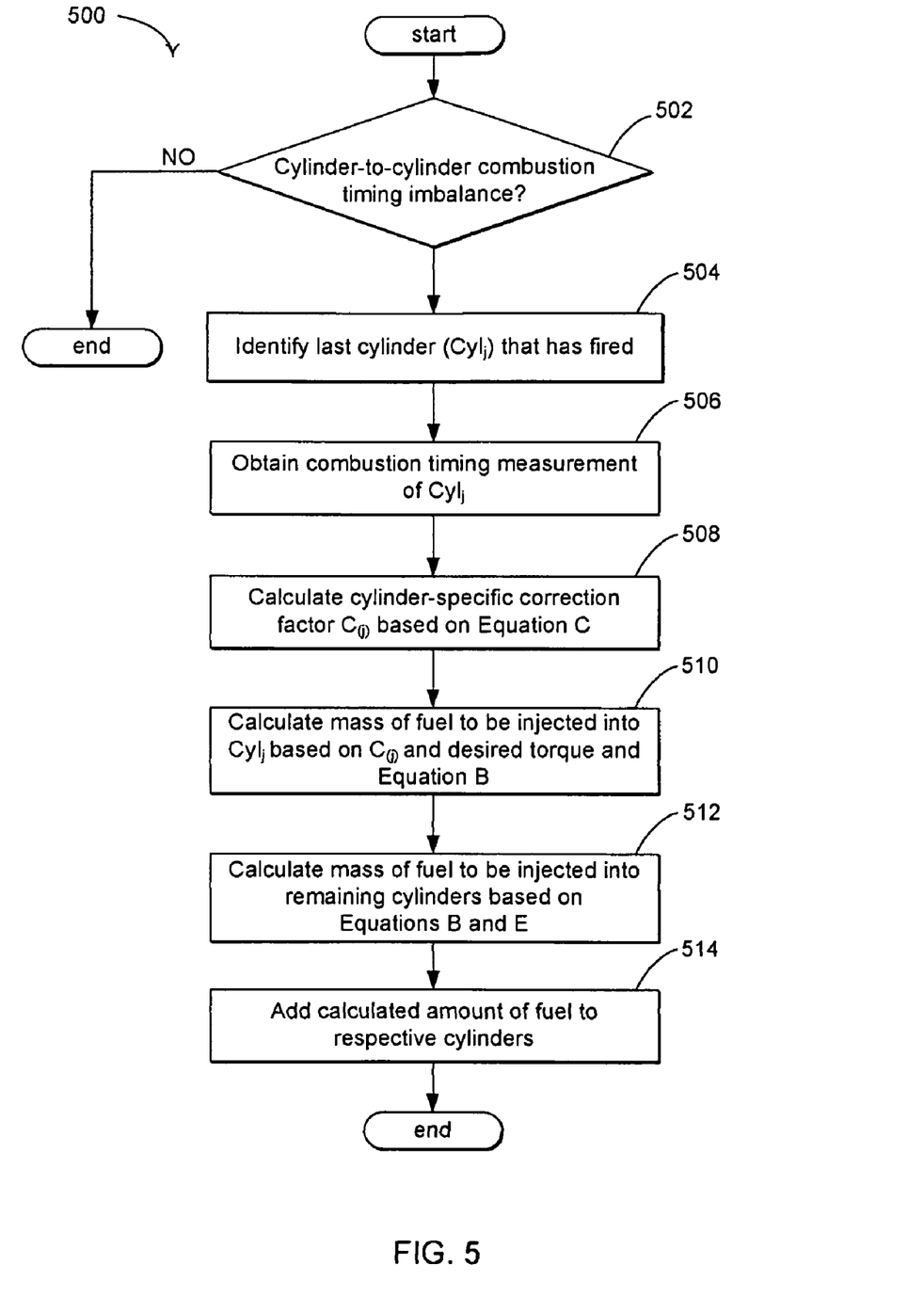
FIG. 5 shows an exemplary flow chart describing a control routine for performing an in-cylinder combustion timing imbalance adjustment protocol.

Continuing with FIG. 3, individual cylinder combustion timing error information is provided to combustion timing controller 320, which is described in further detail herein with regard to FIGS. 4-5. Based on individual cylinder combustion timing errors, which may be relative to timings of other cylinders, fuel injection adjustment signal 322 is provided to injectors 66, which along with intake valve opening (IVO), exhaust valve opening (EVO), and crankshaft position (CP), define the combustion characteristics of cylinders C1, C2, . . . Cn.

In one example, an individual cylinder fuel injection adjustment amount is provided to increase/decrease a fuel injection amount for one or more cylinders to move combustion timing of one or more cylinders toward one another. In particular, the amount of fuel per cylinder is adjusted such that the timing imbalance may be corrected while maintaining the average fuel used per cycle and while maintaining cycle-average torque output. Alternatively, individual cylinder combustion timing imbalances may be addressed by adjusting the variable valve operation profile. In this way, by addressing in-cylinder combustion timing imbalances on an individual basis via adjustments to variable valve settings, cylinder-to-cylinder fuel injection adjustments, or combinations thereof, and further addressing cylinder combustion timing imbalances on an en bloc basis via adjustments to hot and cold throttle settings, valve-train settings, or combinations thereof, cylinder temperature and pressure may be maintained within the prescribed limits preferred for an efficient and stable HCCI combustion, and a desired control of HCCI auto-ignition timing may be achieved.

FIG. 4 shows an example control routine 400 that may be performed by controller 12 for identifying cylinder-to-cylinder combustion timing imbalances. At 402, the engine operating conditions are determined, measured, and/or estimated. These include, but are not limited to, engine temperature, engine coolant temperature, engine speed, manifold pressure, intake and exhaust manifold temperatures, cylinder air amount, feedback from a knock sensor, desired engine output torque, spark timing, barometric pressure, desired boost etc. At 404, it is decided whether the current operating conditions are in a range appropriate for HCCI mode of combustion. If yes, the routine proceeds to verify if HCCI combustion is being carried out at 406. If HCCI is being carried out, routine 400 continues to step 410; otherwise, at 408, the routine transitions the cylinder to the HCCI mode of combustion.

At 410, a cylinder-specific combustion timing is estimated for each cylinder based on various operating parameters, including, data collected by combustion sensor 202.

At 412, based on the data estimated at 410, it is ascertained if there are any cylinder-to-cylinder timing imbalances. If yes, then at 414, an in-cylinder combustion timing imbalance adjustment protocol, herein also referred to as routine 500 and further described in FIG. 5 below, is performed.

FIG. 5 shows an example routine 500 performed by engine 10, when operating in the HCCI mode of combustion, for adjusting cylinder-to-cylinder combustion timing imbalances with respect to one another.

In the HCCI mode, the fuel injection amount may be based on a desired torque input, where the desired torque can be affected by a driver demand, vehicle speed, gear ratio, and/or various other parameters. For example, the relation between the mass of fuel to be injected ($m_{fdes\_k}$) for a desired torque (des_Tq) from the driver may be available from the engine mapping data as the following function, $$m_{fdes\_k} = Fn\_tq2fuel(des\_Tq_k) \quad (A)$$

where subscript "k" denotes the values at time instant t=k×T, with T being the sampling time (the sampling is assumed at PIP).

Balancing of combustion timing may be achieved by varying the amount of fuel injected on a per cylinder basis, while maintaining the average amount of fuel injected over the cycle, and thus the average engine torque. By trimming the amount of fuel injected in each cylinder, the temperature of the cylinder walls and that of the residual gas may be affected. In this way, the combustion timing may be advanced or retarded in the subsequent cycle(s) for the same cylinder. The average mass of fuel required ($m_{fdes\_k}$) for the desired torque (des_Tq) may then be corrected with cylinder specific correction factors (or trim factors) $C_i$ (i=1, 2, . . . , n_cyl) for an engine with n_cyl number of cylinders. The correction factor may correct for errors such as a misdistribution of hot and cold air, residual dilution, and in-cylinder wall temperature, all of which may be reflected in the imbalance of combustion timing. Thus, the revised amount of fuel to be injected into cylinder i may be reflected as, $$m_{finj\_k}(i) = C_k(i) \times m_{fdes\_k} \quad (B)$$

In order to provide the cycle-averaged amount of injected fuel (in steady state) equal to the fuel initially computed from the driver's demand, that the following constraint may be applied, $$\frac{1}{n_{cyl}} \sum_{i=1}^{n_{cyl}} c(i) = 1$$

By first calculating a correction factor for the last cylinder that has fired, responsive to the combustion state of that cylinder, and further by computing a correction factor for all remaining cylinders based on the first calculated correction factor, the timing imbalance between cylinders may be corrected by adjusting the distribution of fuel between cylinders. Based on above mentioned equations (A) and (B), and the desired cycle-averaged fuel usage, appropriate correction factors may be computed as detailed further in routine 500 herein.

Specifically, routine 500 starts at 502 with the detection of cylinder-to-cylinder combustion timing imbalances, from 412 in routine 400 (FIG. 4), for example. If a combustion timing imbalance is detected, at 504 the last cylinder that has fired is identified. This cylinder may be referred to as cylinder j ($Cyl_j$). Next, at 506, the combustion timing measurement of cylinder j is obtained. This may comprise, for example, an estimation of the location of peak pressure (LPP), or the location of 50% burned mass fraction (CA_50). Based on the obtained combustion phasing measurement, and further based on equation C as depicted below, at 508, a cylinder-specific correction factor $C_k(j)$ may be calculated for cylinder j.

$$C_k(j) = \max\left\{C_{min}, \min\left\{\begin{array}{c} C_{max}, C_{k-1}(j) + g \times \\ \left(CA\_50_k - \frac{1}{n\_cyl} \sum_{i=0}^{n\_cyl-1} CA\_50_{k-i}\right) \end{array}\right\}\right\} \quad (C)$$

where g is a small positive update gain and $C_{max}$ and $C_{min}$ are a-priori established upper and lower bounds on the correction factors.

By applying the results of equation C into equation B, at 510, the mass of fuel to be injected into cylinder j may be calculated. To satisfy the constraint on the sum of C(i), specifically the requirement of constant cycle-averaged fuel usage, the correction factors for all other cylinders may also be updated. Since these cylinders did not fire in the last event, no new information is required to distinguish them. Therefore, they may be changed by an amount equal to, but in the opposite direction of, C(i) with an amplitude of $$\frac{1}{ncyl-1},$$

as illustrated in equations D and E such that, $$\Delta C_k(j) = C_k(j) - C_{k-1}(j) \quad (D)$$

For (i = 1, 2, ... n_cyl) and (i ≠ j), $$C_k(i) = \max\left\{C_{min}, \min\left\{C_{max}, C_{k-1}(i) - \frac{\Delta C k(j)}{n_{cyl}-1}\right\}\right\} \quad (E)$$

By applying the results of equation E into equation B, at 512, the mass of fuel to be injected into the remaining cylinders may be computed. Finally at 514, the amount of fuel to be injected into each cylinder, as determined at 510 and 512, is appropriately added to the respective cylinders.

At the next firing event, the combustion state measurements from cylinder j+1 may be collected and when routine 500 is run again, the correction factor C(j+1) may be updated using equation C and other correction factors may be accordingly updated using equation E. In this way, by updating the correction factors for each cylinder at each firing event, cylinder-to-cylinder combustion timing imbalances may be corrected while maintaining the average mass of fuel and the average desired torque per cycle.

Figure 6:
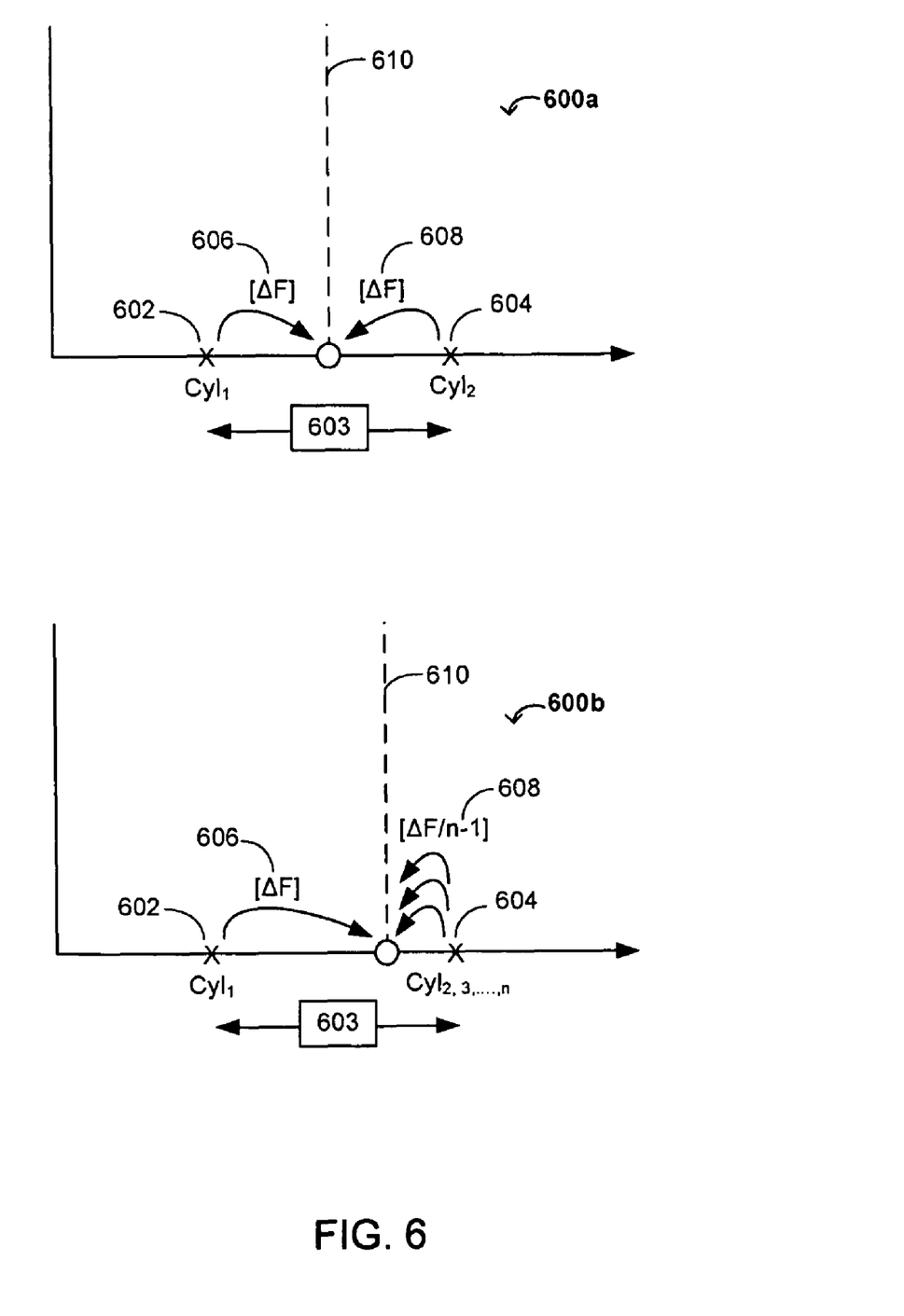
FIG. 6 shows example maps illustrating cylinder-to-cylinder timing imbalance adjustments as per the protocol of FIG. 5

FIG. 6 includes example maps 600a and 600b, which graphically illustrate cylinder-to-cylinder combustion timing imbalance adjustments as per routine 500 of FIG. 5. In map 600a, the timing of two cylinders, $Cyl_1$ 602 and $Cyl_2$ 604, (each portrayed as an X) are depicted before adjustment 500 along the x-axis, separated by timing imbalance 603. Further $Cyl_1$ is identified to be the last cylinder to have fired. Upon running routine 500, as detailed in FIG. 5, a correction factor may be computed for $Cyl_1$, and accordingly computed for $Cyl_2$. Further, an appropriate amount of fuel may be injected into $Cyl_1$, $\Delta F$ 606, and $Cyl_2$, $\Delta F$ 608, respectively, such that the timing imbalance 603 may be removed and the cylinders combustion timings may newly align at 610, herein portrayed as an O along the x-axis. Since there are 2 cylinders in this scenario, the fuel adjustments to each cylinder, $\Delta F$ 606 and 608, may be of an equal amount.

In map 600b, the same protocol is applied to a scenario with multiple cylinders. The timing of the first cylinder $Cyl_1$ 602 and that of the remaining cylinders $Cyl_{2,3\ldots,n}$ 604 is represented along the x-axis, separated by timing imbalance 603, prior to adjustment by routine 500. Herein again $Cyl_1$ is identified to be the last cylinder to have fired. Upon running routine 500, a correction factor may be computed for $Cyl_1$, and accordingly computed for each of the remaining cylinders $Cyl_{2,3\ldots,n}$. Subsequently, an appropriate amount of fuel may be injected into $Cyl_1$, $\Delta F$ 606, and each of the remaining cylinders $Cyl_{2,3\ldots,n}$, $[\Delta F/n-1]$ 608, such that the timing imbalance 603 may be removed and the cylinders combustion timings may newly align at 610. In this scenario, since there are multiple cylinders, the fuel adjustments 608 to each of the remaining cylinders $Cyl_{2,3\ldots,n}$ may be of an amount equal to that of $Cyl_1$ but with an amplitude of $(1/n-1)$. Further consolidated adjustments to cylinder timing may be performed by suitably adjusting hot and cold throttles to alter cylinder charge temperature, as explained previously and as described in FIGS. 2 and 3. Individual or en bloc cylinder combustion timing imbalances may also be addressed by adjustments to cylinder variable valve settings, wherein changes in valve-train settings may bring about changes in air compression ratios and cylinder air-charge temperatures, as also described previously and in FIGS. 2-3.

In this way, the present disclosure permits cylinder-to-cylinder imbalances in combustion timing to be addressed both in a cylinder-specific manner as well as in a consolidated manner. By correcting the mass of fuel injected into each cylinder with a cylinder specific correction factor that adjusts for maldistribution of hot and cold air, residual dilution, and in-cylinder wall temperature, the combustion timing may be synchronized while maintaining the average mass of fuel utilized per cycle. By further adjusting the cylinder timings using hot and cold throttles, variable valve operations, or any combination thereof, the technical challenge of regulating the start of combustion of an engine operating in an HCCI mode may be addressed. Additionally, by correcting cylinder-to-cylinder temperature imbalances and variability, as reflected by combustion timing imbalances and variability, misfires may be reduced and an efficient HCCI mode of combustion may be obtained.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

What is claimed is:

1. A method of controlling fuel injection to a plurality of cylinders of an engine, comprising:
during combustion timing imbalances among a plurality of cylinders carrying out homogeneous charge compression ignition combustion at a given torque, adjusting a fuel injection amount in each cylinder of the engine, where the amount of fuel adjustment of each cylinder is itself based on relative weightings of combustion timings of all of the cylinders, where each adjustment of the fuel injection amount in each cylinder moves the combustion timing of that cylinder to a new, common, combustion timing point for all of the cylinders over one complete engine cycle to maintain average engine torque.

2. The method of claim 1 further comprising adjusting combustion timing of all cylinders of the engine by adjusting cylinder charge temperature.

3. The method of claim 2 further comprising adjusting cylinder charge temperature by adjusting a first and second throttle delivering airflows at different temperatures to the engine.

4. The method of claim 2 further comprising adjusting cylinder charge temperature by adjusting a first throttle delivering warmer airflow in a first direction, and correspondingly adjusting a second throttle delivering colder airflow in an opposite direction to maintain average engine combustion timing at a desired value.

5. The method of claim 2 further comprising adjusting cylinder charge temperature by adjusting cylinder valve operation commonly among each of the cylinders.

6. The method of claim 1 further comprising adjusting a first valve timing of a first cylinder differently than adjusting a second valve timing of a second cylinder based on the combustion timing imbalance.

7. The method of claim 1, wherein a fuel injection adjustment in a first cylinder is adjusted in an opposite direction to a fuel injection adjustment in a second cylinder.

8. The method of claim 1, wherein each adjustment of the fuel injection amount in each cylinder has an amplitude based on a total number of firing cylinders in the engine.

9. The method of claim 1 wherein the average engine torque is an average engine torque over one complete engine cycle of the engine, wherein the engine includes four cylinders combusting over the complete engine cycle.

10. A method of controlling operation of an engine including at least a plurality of cylinders, the engine further including a variable cylinder valve actuator, comprising:
adjusting the variable cylinder valve actuator to adjust combustion timing of homogeneous charge compression ignition in the plurality of cylinders; and
during combustion timing imbalances of homogeneous charge compression ignition combustion at a given torque, adjusting a fuel injection amount in each cylinder of the engine, where the amount of fuel adjustment of each cylinder is itself based on relative weightings of combustion timings of all of the cylinders, where each adjustment of the fuel injection amount in each cylinder moves the combustion timing of that cylinder to a new, common, combustion timing point for all of the cylinders over one complete engine cycle to maintain average engine torque.

11. The method of claim 10, wherein fuel adjustment in a first cylinder is greater than fuel adjustments in a second and third cylinder.

12. The method of claim 11 where combustion timing of the second and third cylinders is moved in a first direction, and a combustion timing of the first cylinder is moved in a second, opposite, direction to reduce the imbalance.

13. A method of controlling fuel injection to a plurality of cylinders of an engine, comprising:

during combustion timing imbalances among a plurality of cylinders carrying out homogeneous charge compression ignition combustion at a given torque, adjusting a fuel injection amount in each cylinder of the engine, where the amount of fuel adjustment of each cylinder is itself based on relative weightings of combustion timings of all of the cylinders, and based on a total number of cylinders, where each adjustment of the fuel injection amount in each cylinder moves the combustion timing of that cylinder to a new, common, combustion timing point for all of the cylinders over one complete engine cycle to maintain average engine torque; and adjusting the combustion timing of all of the cylinders to a desired combustion timing point by adjusting cylinder charge temperature of all of the cylinders.

* * * * *